US008068460B2

(12) United States Patent
Fajardo et al.

(10) Patent No.: US 8,068,460 B2
(45) Date of Patent: Nov. 29, 2011

(54) DYNAMIC PACKET BUFFERING SYSTEM FOR MOBILE HANDOFF

(75) Inventors: Victor Fajardo, Robbinsville, NJ (US); Yoshihiro Ohba, Fort Lee, NJ (US); Kenichi Taniuchi, South Plainfield, NJ (US); Ashutosh Dutta, Bridgewater, NJ (US)

(73) Assignee: Toshiba America Research, Inc., Piscataway, NJ (US)

( * ) Notice: Subject to any disclaimer, the term of this patent is extended or adjusted under 35 U.S.C. 154(b) by 621 days.

(21) Appl. No.: 11/162,199

(22) Filed: Aug. 31, 2005

(65) Prior Publication Data
US 2007/0014259 A1 Jan. 18, 2007

Related U.S. Application Data

(60) Provisional application No. 60/698,950, filed on Jul. 14, 2005.

(51) Int. Cl.
*H04W 4/00* (2009.01)
*H04W 36/00* (2009.01)
*H04W 40/00* (2009.01)
*H04J 3/16* (2006.01)

(52) U.S. Cl. ..... 370/331; 370/338; 370/346; 455/432.1; 455/436; 455/442; 455/445

(58) Field of Classification Search ................... 370/331, 370/346, 338; 455/436, 442, 432.1–445
See application file for complete search history.

(56) References Cited

U.S. PATENT DOCUMENTS 6,651,105 B1 * 11/2003 Bhagwat et al. ............... 709/239
7,936,719 B2 * 5/2011 Fajardo et al. ................ 370/331

FOREIGN PATENT DOCUMENTS

EP 1094647 A2 4/2001

OTHER PUBLICATIONS

Wei-Min Yao et al., "An enhanced buffer management scheme for fast handover protocol," Distributed Computing Systems Workshops. 2004. Proceedings. IEEE, Mar. 23, 2004, pp. 896-902.
D. Jeong et al., "The Performance Analysis of QoS Provisioning Method w/Buffering & CAC in the Multimedia Wireless Internet," IEEE Vehicular Tech. Conf., NY, NY Oct. 7, 2001.
G. Krishnamurthi, Buffer Management for Smooth Handovers in IPv6, IETF Standard Working Draft, Internet Engineering Task Force, IETF, CH, Feb. 13, 2001.

(Continued)

*Primary Examiner* — George Eng
*Assistant Examiner* — Wesley Kim
(74) *Attorney, Agent, or Firm* — Westerman, Hattori, Daniels & Adrian, LLP (57) ABSTRACT

The present invention relates to the use of buffering packets for the mobile node at an access router or network node near the edge of the network that the mobile is moving away from or towards. The buffered packets are then forwarded to the mobile node once the handoff process is completed. This invention also relates to the use of buffering packets originating from the mobile node during the handoff process. The buffered packets are then forwarded to their intended destinations once the handoff process is completed. The buffering system is used in conjunction with existing mobility protocols, access protocols, or as an independent network or link layer mechanism.

36 Claims, 4 Drawing Sheets

PACKET BUFFERING MODEL WITH ACCESS ROUTER ACTING AS BN

OTHER PUBLICATIONS

M. Khalil, "Buffer Management for Mobile IP," IETF Standard Working Draft, Internet Engineering Task Force, IETF, CH Oct. 1999.

N. Monash, Tunnel Buffering for Mobile IPv6, Jul. 9, 2004, p. 1-11, Internet Draft, USA.

R. Koodli, Fast Handovers for Mobile IPv6, Oct. 25, 2004, p. 1-53, Internet Draft, USA.

Chul-Ho Lee, Seamless MPEG-4 Video Streaming over Mobile IP-enabled Wireless LAN, p. 1-9, Korea.

J. Rosenberg, An RTP Payload Format for Generic Forward Error Correction, Dec. 1999, p. 1-25, USA.

J. Ott, Extended RTP Profile for RTCP-based Feedback, Aug. 10, 2004, p. 1-51, Internet Draft, USA.

M. Khalil, "Buffer Management for Mobile IP," Internet-Draft, Oct. 1999, p. 1-20, The Internet Society, USA.

G. Krishnamurthi, "Buffer Management for Smooth HandOvers in Mobile IPv6", Jul. 2000, p. 1-27, The Internet Society, USA.

C. Perkins, "Optimized smooth handoffs in Mobile IP," Proceedings of IEEE Symposium on Computers and Communications, Jul. 1999, p. 1-7, USA.

C. Perkins, "Options for Repair of Streaming Media", Jun. 1998, p. 1-10, The Internet Society, USA.

R. Rejaie, "RAP: An End-to-end Rate-based Congestion Control Mechanism for Real-time Streams in the Internet", Mar. 1999, p. 1-27, USA.

European Office Action dated Apr. 20, 2010, issued in corresponding European Patent Application No. 06781278.4.

\* cited by examiner

DYNAMIC PACKET BUFFERING SYSTEM FOR MOBILE HANDOFF

BACKGROUND

Field of the Invention

The present application relates to wireless networking and, in some preferred embodiments, to methods of improving handoff of a mobile device between neighboring networks and/or the like.

General Background Discussion

1. Networks and Internet Protocol

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

IP (Internet Protocol) is a protocol by which data can be sent from one device (e.g., a phone, a PDA [Personal Digital Assistant], a computer, etc.) to another device on a network. IP is a connectionless protocol. Today there are varieties of versions of IP, including, e.g., IPv4, IPv6, etc. Each host device on the network has at least one IP address that identifies the host device's point of attachment to the IP networks. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point, and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router, or a workstation. Messages destined for some other host are not passed up to the upper layers but are forwarded to the other host. In the OSI and other similar models, IP is in Layer-3, the network layer. The layers of the OSI model are listed below. Layer 7 (i.e., the application layer) is a layer at which, for example, communication partners are identified, quality of service is identified, user authentication and privacy are considered, constraints on data syntax are identified, and the like. Layer 6 (i.e., the presentation layer) is a layer that, for example, converts incoming and outgoing data from one presentation format to another, and the like. Layer 5 (i.e., the session layer) is a layer that, for example, sets up, coordinates, and terminates conversations, exchanges and dialogs between the applications. Layer-4 (i.e., the transport layer) is a layer that, for example, manages end-to-end control and error checking, and the like. Layer-3 (i.e., the network layer) is a layer that, for example, handles routing and forwarding, and the like. Layer-2 (i.e., the data-link layer) is a layer that, for example, provides synchronization for the physical level, does bit-stuffing and furnishes transmission protocol knowledge and management, and the like. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer, interprets commands, and performs error recovery. Layer 1 (i.e., the physical layer) is a layer that, for example, conveys the bit stream through the network at the physical level. The IEEE sub-divides the physical layer into the PLCP (Physical Layer Convergence Procedure) sub-layer and the PMD (Physical Medium Dependent) sub-layer.

Typically, layers higher than layer-2 (such as, for example, layers including the network layer or layer-3 in the OSI model and the like) is referred to as the higher-layers.

2. Wireless Networks

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, for example, a single chip transceiver with an integrated transmitter, receiver and, if desired, other functions); an antenna; a processor; one or more audio transducers (for example, a speaker or a microphone as in devices for audio communications); electromagnetic data storage (such as, for example, ROM, RAM, digital data storage, and the like, such as in devices where data processing is provided); memory; flash memory; a full chip set or integrated circuit; interfaces (such as, for example, USB, CODEC, UART, PCM, etc.); and/or the like.

Wireless LANs (WLANs) in which a mobile user can connect to a local area network (LAN) through a wireless connection may be employed for wireless communications. Wireless communications can include, for example, communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, for example, a BDN, a BDA, an IP address, and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two or more independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11x devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their initially assigned IP Address. Mobile IP enhances Internet Protocol (IP) and adds a means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, as for example, the Internet Control Message Protocol (ICMP).

In basic IP routing (i.e. outside mobile IP), typically, routing mechanisms rely on the assumptions that each network node always has a constant attachment point to, for example, the Internet and that each node's IP address identifies the network link to which it is attached. As used herein, the terminology "node" includes a connection point, which can include, for example, a redistribution point or an end point for data transmissions, and which can recognize, process and/or forward communications to other nodes. For example, Internet routers can look at, for example, an IP address prefix, or the like, identifying a device's network. Then, at a network level, routers can look at, for example, a set of bits identifying a particular subnet. Then, at a subnet level, routers can look at, e.g., a set of bits identifying a particular device. With typical mobile IP communications, if a user disconnects a mobile device from, for example, the Internet and tries to reconnect it at a new subnet, then the device has to be reconfigured with a new IP address, a proper netmask, and a default router. Otherwise, routing protocols would not be able to deliver the packets properly.

3. Handoffs of Mobile Devices

In the context of, for example, a mobile device with an IP-based wireless network interface (such as, e.g., an IEEE 802.11 or an 802.16 interface), the mobile device needs to perform roaming or handoffs when it moves from one network into another network. With existing handoff methodologies, handoff is typically accomplished by performing the following sequence of protocol layer specific handoffs.

First, handoff takes place at the physical layer. In this regard, the mobile device switches its radio channel to, e.g., a wireless base station or wireless access point in the target network.

Second, handoff takes place at layer-2. In this regard, the mobile device switches its layer-2 (i.e., link-layer) connections to the target network. As explained above, the link layer or layer-2 refers to the protocol immediately below the IP-layer that carries user traffic. The mobile device performs layer-2 authentication with the target network if the target network requires such authentication.

Third, handoff takes place at the IP-layer. In this regard, the mobile device obtains a local IP address from the target network, performs IP-layer authentication if required by the target network, and then performs IP-layer location update so that IP packets destined to the mobile device can be routed by the IP network to the mobile device via the target network. In some instances, one way to support IP layer location update is to use Mobile IP defined by the Internet Engineering Task Force (IETF).

Forth, handoff takes place at the application-layer. The mobile device performs necessary steps at the application layer to ensure that its application traffic will flow correctly to the applications on the mobile device via the target network. For example, when the mobile device uses the Session Initiation Protocol (SIP) defined by the IETF to manage its application-layer signaling, an application layer handoff can be achieved by the mobile device updating its current location with its home SIP server. The mobile device may also need to carry out application-layer authentication with the target network if required by the target network. This is the case, for example, when the mobile device is using the IP Multimedia Subsystem (IMS) in a visited 3GPP ($3^{rd}$ Generation Partnership Project) wireless network, where the IMS is a SIP-based system supporting application-layer signaling and management for multimedia applications over 3GPP networks.

Sometimes, either IP-layer handoff or application-layer handoff is sufficient. That is, it may be unnecessary to perform both IP-layer and application-layer handoff. These existing methods can lead to significant handoff delays when they are used in IP-based wireless networks. For example, in a geographical region where there are many wireless local area networks (WLANs) such as in cities, inside building complexes or residential homes, or in other public places where multiple wireless LANs exist, a mobile device may receive strong radio signals from multiple radio networks at the same time. However, the mobile device may not be authorized to use some of these radio networks.

Under the existing handoff methods described above, a mobile device will select a target network based on, for example, radio signal strengths, and will go through the steps described above to connect to the target network and then discover, for example, if it is authorized to use the network or if the network does not provide the capabilities (e.g., sufficient available bandwidth) or the services that the mobile device needs. Consequently, the mobile device will have to try to connect to another network, and will repeat this process until it finally connects to a network that provides, and that allows it to use, the capabilities and services it needs (or until it has exhausted all possible networks). Accordingly, with existing systems, a handoff can take a long time that can be intolerable and can delay sensitive applications such as, as some examples, live voice, and/or video applications.

While a variety of systems and methods are known, there remains a need for improved systems and methods for performing handoffs in wireless networks.

SUMMARY OF THE INVENTION

A broad aspect of the preferred embodiments of the present invention is the handing off without packet loss, between a mobile device traveling along a series of neighboring networks and correspondent node. The mobile node can encounter a period during which there is no network connectivity when moving from one network to another. Negating handoff packet loss can be achieved through the use of a per-mobile packet buffer that is located on an access router, a network node near the edge of the network from which the mobile is moving away, a network node near the edge of the network that the mobile is moving towards, and/or a mobile node. The buffered packets are forwarded to the mobile node when the handoff process is completed.

Another aspect of the preferred embodiments is the use of the buffering in conjunction with existing mobility protocols, access protocols, or as an independent network or link layer mechanism and the protocol used for buffering control is defined as a separate protocol, such that the system is universally compatible with mobility management protocols. The buffering control protocol signals events and parameters between the mobile device and the mobile node.

Another aspect of the preferred embodiments defines the tunnel establishment mechanism used for forwarding buffered packets to the mobile node, to provide independency of mobility management protocols.

Another aspect of the preferred embodiments is the buffering of packets that are in transit during the handoff period in a buffer node. Upon completion of handoff, the buffered packets are flushed and forwarded to the mobile device in its new location. A buffering node can be provided in the mobile device for buffering egress packets during the handoff period in the mobile device buffer node, and buffer node can be provided at the network edge for buffering packets that are sent from the network edge buffer not to the mobile device. Providing buffering nodes at the mobile device and at the mobile devices provides bi-directional buffering during handoff and compensating for packet loss in both directions.

In another aspect of the preferred embodiments, pre-handoff traffic reaches the mobile device via the previous network prior to handoff. When the mobile device is ready to move to a new network, it signals the buffer node of its intent and the buffer node begins to buffer traffic destined for the mobile device. Upon completion of handoff the mobile device signals the buffer node to flush buffered packets and forward the buffered packets to the mobile device in its new network, the buffer node may reside on a node that requires temporary buffering support, and can reside on either a previous access router, a next access router, or the mobile device.

In another aspect of the preferred embodiments, a buffer node is a network entity that intercepts packets destined for one or more mobile device and temporally buffers the packets to avoid packet loss while a mobile devices is in the handoff process, the buffer node classifies packets for each mobile node, buffers classified packets, and forwards buffered packets appropriately after handoff is completed, and wherein each of these steps is signaled by a mobile device that requests buffering service.

In another aspect of the preferred embodiments, the existing buffering control protocol signals the forwarding of the buffered packets after a positive end of service, the buffer node having been provided with the current care-of-address of the mobile device when it starts flushing the buffered packets. The buffering control protocol also signals to the buffer node the current care-of-address of the mobile node prior to flushing and forwarding of buffered packets.

In another aspect of the preferred embodiments, when the mobile device and the buffer node are on the same IP subnet, the buffered packets are sent locally to the mobile device, and when the mobile device and the buffer node are on different IP links, the buffered packets are sent to its next hop router towards the mobile device and are routed to the mobile device using IP routing.

In another aspect of the preferred embodiments, {TC "Buffering Phase" \f C \I "3"} a buffering phase spans the period during which traffic classification and buffering is occurring, beginning immediately after the buffer node responds to the initial buffering request indicating that buffering service is being provided and ends when an end of service condition is met. During the buffering phase, the buffer node and the mobile device can exchange one or more extension requests, and wherein each exchange completes an extension request negotiation.

Another aspect of the preferred embodiments defines that the buffering control protocol enables the mobile node to specify the type of traffic to be buffered (traffic classification). This allows the mobile node the flexibility of signaling to the buffer node to buffer traffic of interest only. This also assists the buffer node in reducing resource allocation needs for the buffering request.

Another aspect of the preferred embodiments defines that the buffering node to adjust and negotiate the resources to be allocated in performing the buffering service. The amount of resource to allocated are computed on a per request basis and takes into account the handoff requirement of the mobile node as well as the availability of resources in the buffering node. Such negotiation is part of the buffering control protocol.

Another aspect of the preferred embodiments defines the buffering node to be present in mobile node. This assists software applications present in the mobile node that is sending packets. The transmitted packets are buffered when handoff is occurring. In such scenario, the signaling of the mobile node to the buffer node is done locally. When the buffered packets are to be flushed and forwarded, the destination IP address of the buffered packets are left unchanged and will be routed via normal IP routing.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which.

DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein.

Introduction to the Preferred Embodiments

The following abbreviations are employed herein: Mobile node (MN); Correspondent Node (CN); Buffering Node (BN); Flushing Policy (FP); Buffering Control Protocol (BCP); End of Service (EOS); Buffer Size (bsz); Time-limited Timeout (hp); Classified Traffic (tc); CoA (Care-of Address); and Result Code (rcode).

In a mobile environment, it is expected that a mobile node (MN) moving from one network to another will have a period where there is no network connectivity. Therefore, packets in transit destined for the MN will most likely be lost during the handoff period (HP). The handoff period is exacerbated by the fact that the traffic path of packets for MN still goes through the previous network until the MN has notified the proper entity of its new location (binding updates for Mobile IPv4/6). In such cases, packet loss is incurred from the moment the MN leaves the previous network up to the time the appropriate entity learns of the MN's new location (HA or CN for Mobile IPv6 route optimization) and forwards the packets appropriately. Such lengthy period of loss will severely hinder the quality of streaming applications that cannot fully compensate for the loss.

Existing techniques attempt to alleviate such loss at the network end points (i.e. the media applications). Most multimedia applications resort to playout buffers, FEC [10], RTCP-based feedback [8], and other techniques [9] to minimize the effects of packet loss or to fix small gap in the traffic. However, existing solutions do not take into account excessive packet loss or excessive delay nor support real-time applications such as VoIP that are sensitive to loss and delay. In addition, these mechanisms depend heavily upon the cooperation of the end systems. Any re-transmission based mechanism will contribute to the delay if the CN is far from the MN. The present invention provides a solution beyond the application end points by providing a per-mobile packet buffer at an access router or network entity (Buffering Node) near the edge of the network where the mobile is moving away from or moving towards. Packets that are in transit during the handoff period will be buffered in the Buffering Node (BN). When handoff completes, the buffered packets will be flushed and forwarded to the MN in its new location. This approach provides zero packet loss for all packets destined for the MN that have reached the BN. The solution also describes a buffering scheme that enables the MN to have greater granular control over the behavior of the BN to help reduce the overall handoff delay.

Outgoing packets sent by the MN during the handoff period can be also be lost during the handoff process. In such a case, a BN can also be implemented locally in the MN to provide a buffering solution for egress packets during the handoff period. Having a BN in both the MN and the network edge provides bi-directional buffering during handoff and compensates for packet loss in both directions.

The BN may also be located within the access point specifically to assist an MN that performs active scanning. When an MN performs active scans on channels different from the currently associated access point it can no longer receive packets from that access point. One embodiment of the uses MN power saving mode to signal scenario to the access point and enables it to start buffering on behalf of the MN. Implementing a BN on the access point itself, provides the same functionality with better control on the buffering period and buffer size, as described in 2.1.6.

1.1. Background

The preferred embodiments improve upon the follow and/or other background information. Each of the following documents is incorporated herein-by-reference in its entirety:

[1] Moore, N., Choi J., Pentland Bret, "Tunnel Buffering for Mobile IPv6," draft-moore-mobopts-tunnel-buffering-00.txt, July 2004;

[3] Khalil, M., Akhtar H., Qaddoura E., Perkins C., Cerpa A., "Buffer Management for Mobile IP," draft-mkhalil-mobileip-buffer-00.txt, October 1999

[3] R. Koodli, "Fast Handovers for Mobile IPv6," draft-ietf-mipshop-fast-mipv6-03.txt, October 2004;

[4] Krishnamurthi G., Chalmers R., Perkins C., "Buffer Management for Smooth HandOvers in Mobile IPv6," draft-krishnamurthi-mobileip-buffer6-00.txt, July 2000;

[5] Chul-Ho Lee, Dongwook Lee, JongWon Kim, "Seamless MPEG-4 Video Streaming over Mobile IP-enabled Wireless LAN," Network Research Workshop 2004/18th APAN meeting;

[6] Perkins C., Wang K-Y., "Optimized smooth handoffs in Mobile IP," Proceedings of IEEE Symposium on Computers and Communications, July 1999;

[7] Pejman Roshan, Jonathan Leary, "802.11 Wireless LAN Fundamentals," Cisco Press, ISBN 1587050773, December 2003;

[8] Rosenberg J., Schulzrinne H., "An RTP Payload Format for Generic Forward Error Correction", RFC 2733, December 1999;

[9] Perkins C., Hodson O., "Options for Repair of Streaming Media," RFC 2354, June 1998;

[10] Bremen J., Wenger S., Sato N., et. Al., "Extended RTP Profile for RTCP-based Feedback (RTP/AVPF)," draft-ietf-avt-rtcp-feedback-11.txt, August 2004;

[11] Reza Rejaie et al. RAP: An End-to-end Rate-based Congestion Control Mechanism for Real-time Streams in the Internet, March 1999.

There have been two proposals that provide a generally similar buffering functionality [1,2]. Both proposals define extensions to Mobile IP (v4/v6) protocol to support buffering in the network during a handover period. The preferred embodiments include, for example, one or more, preferably all, of the following new characteristics that are not supported by the existing proposals.

The existing proposals are tightly coupled with specific mobility management protocols. By way of contrast, the present method can work with any mobility management protocol by defining the buffering control protocol as a separate protocol.

In the existing proposals, location of buffering node is limited to mobility agents such as home agent and mobility anchor point. In contrast, the present method provides more flexibility on location of buffering node.

In the existing proposals, forwarding of buffered packets to the mobile node after completion of the handover period depends heavily on the forwarding behavior of the mobility agent of the coupled mobility management protocol. In contrast, the present method defines its own tunnel establishment mechanism used for forwarding buffered packets to the mobile node to provide perfect independency of mobility management protocols.

In the preferred embodiments of the present method, detailed queuing and forwarding mechanisms for the buffering packets as well as detailed behavior in erroneous situations are defined, while such details are missing in the existing proposals.

There is no existing protocol defined at link layer specialized for controlling packet buffering at access point during a handover. The preferred methods described herein can be defined at link-layer for controlling packet buffering at access point during a handover.

A comparison between some embodiments of the present methods and existing methods are provided below.

Reference [1] describes the use of adding a P-bit in the mobility header of BU (Binding Update) and LBU (Local Binding Update) messages. The value of the P-bit indicates to the HA (Home Agent) when to buffer (P-bit is '1') and when to forward the packets (P-bit is '0'). The approach is limited in comparison to some embodiments of the present methods where, e.g., dynamic negotiations can occur and multiple behaviors at end of buffering can be selected.

Reference [2] describes a Mobile IPv4 buffering protocol that resembles the method presented by the present invention. The closest similarity is the explicit definition of a control protocol to manage buffering duration, negotiate buffer size as well as traffic flow identification information (IP traffic filters). Within the restrictions of Mobile IPv4 environment, reference [2] recommends explicit signaling to determine the duration of the buffering period but also implies a lease time to the buffer. Although the present method may have some similarities in function, it works beyond the Mobile IPv4 topology and the BN's location is not limited to the FA (Foreign Agent) or HA (Home Agent).

Reference [4] is a Mobile IPv6 version of [2] and describes a similar mechanism. A feature present in the invention that is not supported by the existing methods is buffer management discovery. It takes advantage of IPv6 router advertisement to check the buffering capability of a network. Overall, the methods described in [4] and [2] are substantially identical.

References [8, 9, and 10] provide alternative mechanisms to reduce packet loss without the use of any buffer management protocol and depend heavily on the cooperation of the end clients.

There is an existing method that uses the power management functionality of IEEE 802.11 for avoiding packet loss while the MN (Mobile Node) is actively scanning [7]. In this method the MN signals the current access point that it is entering sleep mode and the access point attempts to buffer packets for the MN until the MN wakes up. However, among other things, this method cannot be used for buffering packets during a handover. This shortcoming is due to the method assuming that the MN continues to be associated with the access point after it wakes up to stop buffering and the applicability is limited because the method does not carry additional information such as traffic flow identification information, buffer size and buffering period which might be required to meet particular QoS requirements.

2. Architecture

In preferred embodiments, there are two (2) major components required for the buffering scheme, a BN, and a buffering control protocol (BCP). The BCP signals events and parameters between the MN and the BN. It is a reliable protocol composed of request (BReq) and answer (BAns) pairs with re-transmission capabilities. The BCP is discussed in detail in Section 3.

Figure 1:
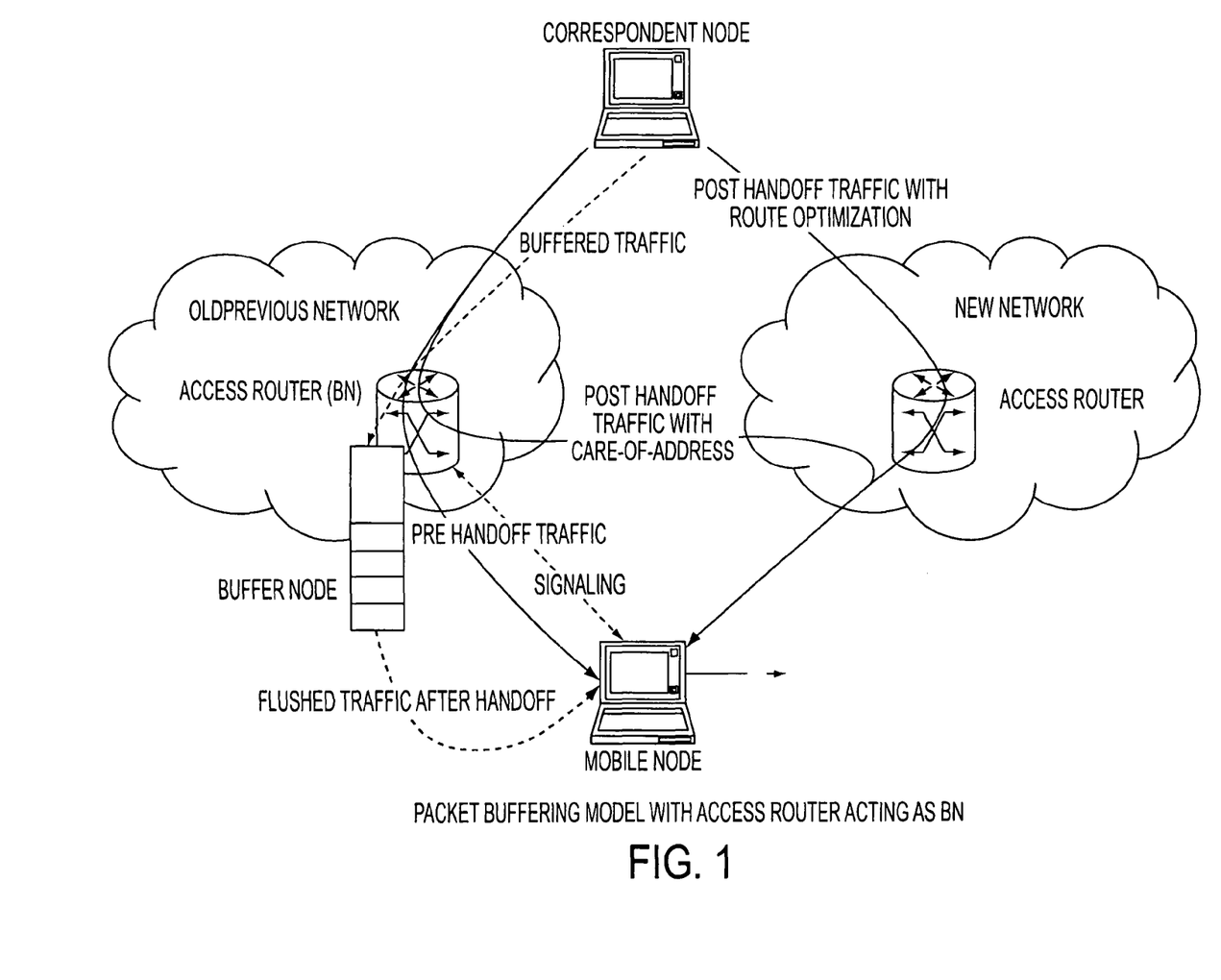
FIG. 1 is a diagrammatic representation of a Packet Buffering Model with access router acting as BN.

In this architecture, there is a clear separation between buffering and forwarding that enables buffered packets to be forwarded to any node when the buffers are being flushed as discussed in Sec 2.1.5. In the case of mobility protocols, forwarding is performed regardless of whether tunneling is involved. The use of a BCP also defines a clear separation from any mobility management protocol. Some of the BCP usages are as follows:

1. Between an end-host and its access router as shown in FIG. 1;
2. Between an end-host and its access point. In this case, the buffering control protocol may be defined at either L2 or L3.

Figure 2:
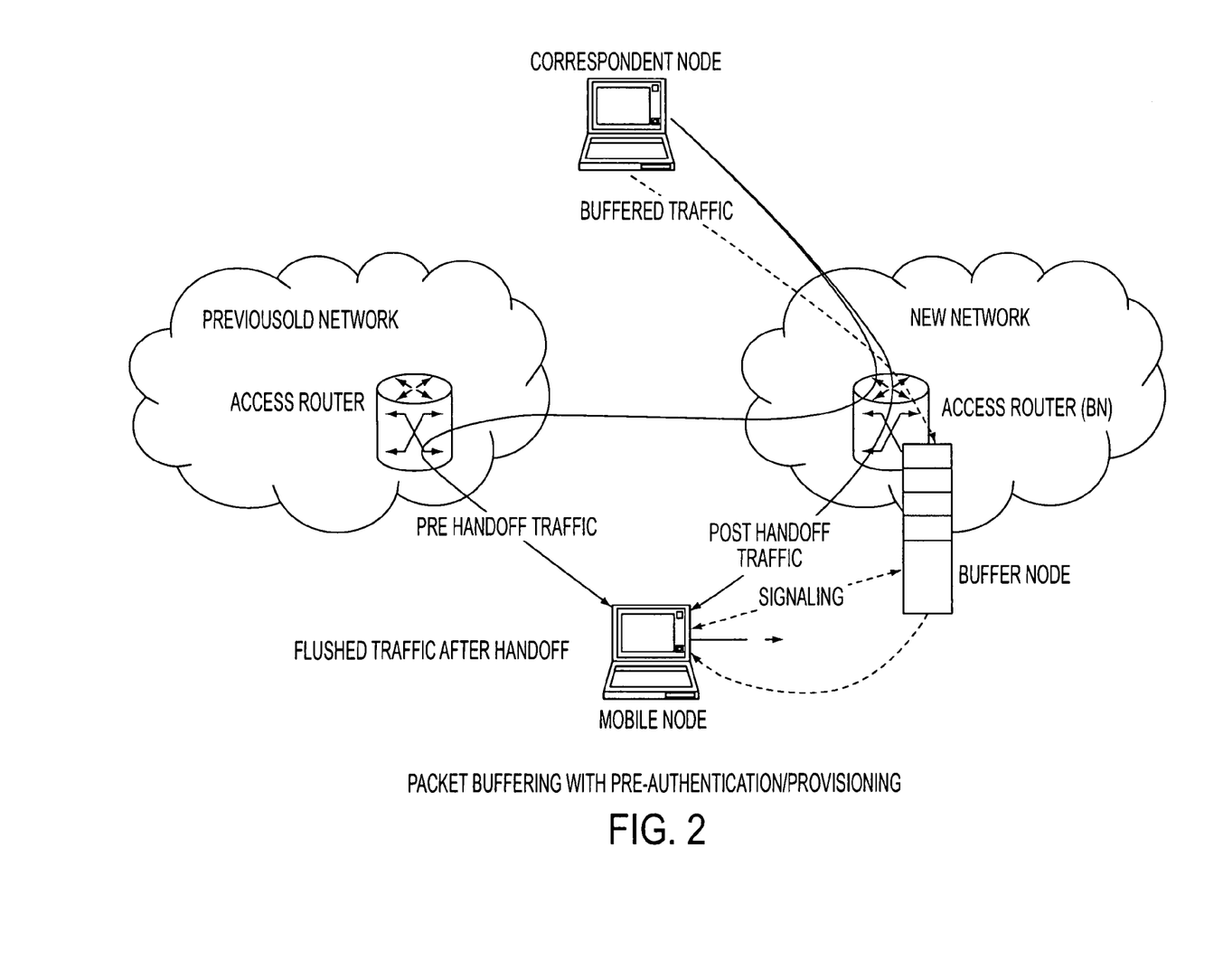
FIG. 2 is a diagrammatic representation of Packet Buffering with pre-authentication/provisioning.

A Packet Buffering Model with access router acting as BN is illustrated in FIG. 2. The buffering model is best described using traffic flows 116, 122, and 104 going towards the MN 102. Prior to handoff, pre-handoff traffic 118 reaches the MN 102 via the previous network 110. Once MN decides to move to the new network 112, it explicitly signals the BN 106 of its intent. BN 106 then starts to buffer traffic 116, destined for the MN 102 that is still being forwarded through the previous network 110. Once handoff completes, MN 102 signals BN 106 (explicit or implicit), as indicated by line 120, to flush the buffered packets 104 and forward it to the MN 102 in the new network 112. However, it is important to note that the location of the BN is not limited to this topology. The BN can reside on any node that requires temporary buffering support as discussed in Sec 2.1.6. As an example, previous access router 108, next access router 109, and the mobile device 102, can all have the buffering capability. Post handoff traffic with route optimization between the correspondent node 100 and MN 102, is represented by flow line 114.

Flow line 122 shows the post handoff traffic with care-of-address between the CN and the MN 102. There are two major components required for the buffering scheme, a BN, and a buffering control protocol (BCP). The BCP signals events and parameters between the MN and the BN. It is a reliable protocol composed of request (BReq) and answer (BAns) pairs with re-transmission capabilities. The BCP is discussed in detail in Sec 3.

2.1 Buffering Node

In the preferred embodiments, a buffering node (BN) is a network entity that intercepts packets destined for one or more MN and temporally buffers them in order to avoid packet loss while the MN(s) is in the handoff process. To do this, the BN has to be able to classify packets for each MN, buffer the packets, and forward the buffered packets appropriately after handoff is completed. In addition, each of these steps is signaled by an MN that requests buffering service.

2.1.1 Buffering Node and the Buffering Control Protocol

In relation to MN, BN is a passive entity. MN uses the BCP to request buffering service from the BN. The protocol also communicates buffering request result and error conditions including signaling errors. BN only responds to request (sends a BAns for each BReq received) but never generates them. The BCP is discussed in detail in Sec 3.

2.1.2 Traffic Classification

The BN must be able to classify traffic and allocate buffers dynamically for each MN asking for service. Classification of the traffic that must be buffered is dictated by the MN when it sends a BReq[initial]. [initial] specifies the signal type (initial) and signal parameters sent by the MN including traffic classification information. The MN may be interested only in buffering certain types of traffic as opposed to all traffic destined for the MN. If classification information is not provided by the MN, the BN should buffer all traffic for the MN.

2.1.3 Buffer Size (bsz) Allocation

The size of the buffer allocated by BN can also be negotiated by the MN in BReq[initial]. The MN may have prior knowledge of the length of the handoff period and traffic rate and thereby be able to compute a reasonable value for buffer size (bsz). However, the BN can impose a limit on this value to conserve memory resources. Therefore, the BN dictates the final value for the bsz. This final value is communicated back to the MN by the BN as part of BAns[initial]. If the value imposed by the BN is unacceptable to the MN then the MN may withdraw its request for buffering service by signaling a BReq[stop] to the BN indicating its intent to terminate the buffering service.

The MN may also indicate in the Breq[initial] if the bsz it proposes is amount it requires and it cannot accept any less. The MN can indicate this by setting mandatory flag (flag.m) in Breq[initial] parameters. In the case where the BN cannot accommodate this requirement, then the BN immediately terminates the service and communicates the error back to the MN via BAns[initial]. In such a case, the BN should not even keep state information regarding the service.

Although the value of the bsz is set during the initial negotiation, it can also be dynamically adjusted during the course of buffering service. Details can be found in Sec 3.3.2.

2.1.3 Buffering Service Duration

Since the buffering service is a transient service, buffering begins once BN has received a BReq[initial] from an MN and negotiated values have been established. State information regarding the service is then maintained by the BN. If for some reason the BN is not able to accommodate the initial request, it may communicate this failure to the MN as part of the BAns[initial] as described in Sec 2.1.7. The buffering service should at least encompass the handoff period for which the MN is not able to send or receive IP packets. The termination of the buffering period is the end of service (EOS) duration that can have a positive or negative outcome. A buffering period (bp) with a positive outcome can be determined using both time-limited and explicit signaling method, as described in Sections 2.1.3.1 and 2.1.3.2, respectively. Both methods are mutually exclusive but complementary since one can be used to pre-empt the other. A buffering period with a negative outcome occurs when error conditions are met as described in Sec 2.1.7.

2.1.3.1 Time-Limited Buffering

The BN and MN can negotiate a time-limited timeout value (bp) to determine the EOS. Expiration of the timeout prior to an explicit receipt of BReq[stop] constitutes a positive EOS and enforcement of existing flushing policy (FP) as described in Sec 2.1.4. A large bp value can cause the buffer to overflow. In such a case, buffer overflow contingencies are be performed as described in Sec 2.1.71. The length of the timeout encompasses the handoff period for which the MN is not able to send or receive IP packets.

2.1.3.2 Explicit Signaling

An explicit receipt of BReq[stop] prior to expiration of a previously established bp value constitutes a positive EOS and enforcement of existing FP. See As described in Sec 2.1.4. Prior BReq[ext] signals may also have carried a new FP value that overrides any existing policy. In such a case, the new FP should be enforced. The duration of the explicit signal should encompass the handoff period for which the MN is not able to send or receive IP packets. Explicit signaling may be used together with the time-limited buffering. It can also be used to accommodate dynamic behavior of the network such as a change in the buffer size requirement.

2.1.3.3 Error Condition

Error conditions that occur during buffering service which forces the buffering service to terminate should constitute a negative EOS. Any existing FP may be enforced if the BN attempts to perform limited recovery. In general, however, error conditions should be treated fatal and all resources and state information allocated to the service should be released to the system. See 2.1.7.

2.1.4 Flushing Policy

The BReq[initial] as well as subsequent BReq sent by the MN dictates the policy that the BN enforces against any buffered packets once EOS is met. The flushing policy (FP) enforced by the BN either forwarding, dropping the buffered packets to sending explicit error notification to the MN using the BCP or an out-band mechanism such as ICMP. BReq[initial] from the MN contains the default FP enforced by the BN once buffering service ends without receipt of any subsequent BReq[ext] overriding the default FP. Subsequent BReq[ext] containing a new FP overrides any previously established FP.

2.1.5 Packet Forwarding

When the existing FP forwards the buffered packets after a positive EOS, the BN must be able to know the current CoA of the MN when it starts flushing the buffered packets. The current CoA of the MN may be the same as that is registered in the BN, or may be different if the MN has changed its CoA after registering with the BN. To make the BCP work with any mobility management protocol, the BCP itself has a mechanism to indicate to the BN the current CoA of the MN, when the BN starts flushing the buffered packets. This is achieved by including the current CoA of the MN in the BReq[stop] message. In the case of time-limited buffering as described in Sec 2.1.3.1 where BReq[stop] is not signaled, the BCP may include the CoA in BReq[ext] signal prior to expiration of the bp. The BN may use the last signaled CoA if more than one BReq[ext] is sent by the MN that has differing CoA.

Preferably, flushing the buffered packets and forwarding of the buffered packets is performed as follows.

If the MN and BN are on the same IP subnet, the buffered packets are sent locally to the MN by using the address resolution protocol (ARP). Otherwise, if the MN and BN are on different IP links, the buffered packets are sent to its next hop router towards the MN and are routed to the MN using IP routing. In the latter case, the buffered packets can be carried in an IP tunnel between the BN and the current CoA of the MN. If this IP tunnel does not exist prior to performing explicit signaling to stop buffering, it is established by the explicit signaling via a BReq[stop] and BAns exchange or bp expiration. The BN must maintain a mapping between the current CoA and the CoA of the MN in the previous network, as part of the IP tunnel establishment. IP routing of the buffered packets can then result in forwarding of the packets through the IP tunnel. In some cases where this IP tunnel is established via a mobility management/optimization protocol such as FMIP6 [3], the tunnel is be used for forwarding the buffered packets instead of creating another tunnel.

An alternative to creating an IP tunnel in the case where MN and BN are on different IP links, the BN can be able to modify the destination address of the buffered IP packets. During forwarding, the BN can set the destination IP address of the buffered packets to the current CoA. The packets will then be forwarded via normal IP routing towards the current CoA. This reduces the additional management associated with establishing and maintaining an IP tunnel to the MN. It also assists in the case where the IP mobility management protocol may not have tunneling functionality available or if there is no mobility management protocol in use.

2.1.6 Location of BN in the Network

Although the BN can be placed at any node that is on the communication path between the MN and the CN, it is preferred to place the BN either at the previous access router to which the MN is attached before handoff, as shown in FIG. 1, or at the new access router, as shown in FIG. 2, to which the MN is attached after handoff. FIG. 2 shows Packet Buffering with pre-authentication/provisioning and in the case where the BN 214 is located on the new network, it maybe assumed that some pre-authorization and pre-provision is done prior to the MN moving. The pre-provisioning procedure enables the BN to determine the address of the MN even prior to moving without the aid of any mobility protocols. In all cases however, whether the BN is located in the previous or new network, the same architecture can be adapted and interaction between BN and MN does not change.

Access router 204 is in the previous network 216, and the access router (BN) 205, in the new network 218. Flow line 206 represents the pre-handoff traffic between CN 202 and MN 200. Flow line 210 represents post handoff traffic between the correspondent node 102 and MB 200. Flow line 212 represents the buffered traffic between CN 202 and BN 214. The flow line 208 represents signaling between the MN 200 and the BN 214.

Figure 3:
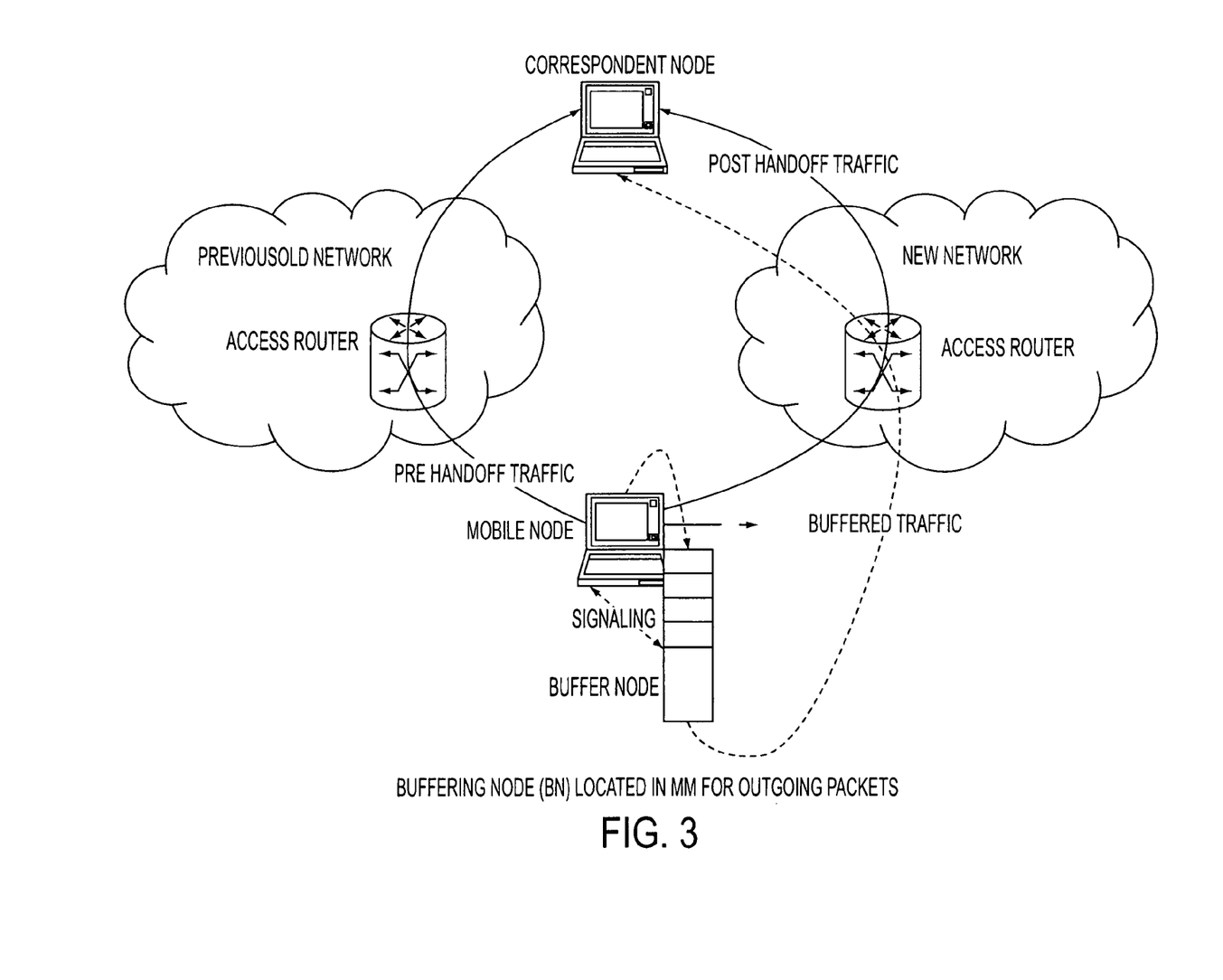
FIG. 3 is a diagrammatic representation of a Buffering Node (BN) located in MN for Outgoing Packets.

Another location of the BN can be within the MN itself, as illustrated in FIG. 3. The access router 314 is in the new network 302, and access router 318 is in the previous network 300. Flow line 312 represents the buffered traffic between CN 304 and the MN 324.

The flow line 306 represents pre-handoff traffic from the MN to the CN. Flow line 308 represents signaling between the MN and the buffer node 310. Flow line 316 represents post-handoff traffic from the BN 310 to the CN 304.

In this regard, FIG. 3 shows a Buffering Node (BN) located in MN 324 for Outgoing Packets. In this case, the BN serves as a buffering service to outgoing packets for the MN during the handoff period. This usage is mutually exclusive and complements the BN locations previously disclosed. With a BN present in the MN, bi-directional buffering can be achieved. As with previous locations, the architecture of the BN and its interaction with the MN does not change.

The presence of a BN in the MN also helps in case of ping-pong effects during handoff. Ping-pong effects occur, e.g., when the MN fails complete handoff in the new network and re-associates itself to the previous network. In such a case, the BN acts as recovery mechanism for packets that may have been lost during the failed handoff attempt. When buffering is performed at the MN for outgoing traffic, the forwarding behavior of the buffered packets is determined solely by the destination address of each packet. In addition, no external signaling is needed for buffering outgoing packets at MN.

Reference [11] discusses buffering outgoing traffic to provide congestion control, however it does not specifically deal with mobility scenario.

The BN may also be located within the previous access point to assist in buffering packets when the MN is actively scanning for finding a new access point or testing connectivity to a new access point.

2.1.7 Error Conditions

Error conditions or negative EOS can occur because of the following.

2.1.7.1 BN Unable to Provide Service

A BN may receive a BReq[initial] for an MN for which it cannot comply due to resource limitations. This may happen when the BN's resource is already limited due to existing buffering service provided to other MN's. This may also occur if the BN decides that the parameters imposed by the MN in BReq[initial] is greater than the total amount of resource that can be provided by the system. In such cases, the BN can communicate this failure to the MN in the BAns [initial] notifying the MN of the BN's inability to provide the requested service. The BN should not keep any state information for the requested service. The MN may choose to re-submit a new BReq[initial] with an adjusted value. In such a case, the BN will treat this as a new request for service.

2.1.7.2 Buffer Overflow

Buffer overflow occurs when the number of packets being queued by the BN has exceeded the capacity of the allocated buffer before the buffer EOS has been met as described in Sec 2.1.3. In such a case, it may not be possible for the BN to communicate the situation to the MN and negotiate subsequent actions such as extending the buffering period via BReq [ext]. MN may be in the middle of handoff process so the BN should take the following action based on previously configured administrative policies.

2.1.7.2.1 Tail Drop Until End of Buffer Duration is Met

In order to provide a recoverable environment, the BN can choose to maintain only the currently buffered packets and drop subsequent newly arrived packets (tail drop). Once the end of buffer duration is met, it can enforce the existing FP as described in 2.1.4. This enables the BN to limit the number of packets that the MN would loose.

2.1.7.2.2 Terminate the Buffering Service

In conditions where recoverability is not desired or not possible due to resource limitations, the BN may choose to completely terminate the buffering service and release all resources associated with it. In such a case, the MN can be able to learn of the BN's action once subsequent BReq/BAns signaling is exchanged. The BN can silently discard all the relevant state it keeps for the associated buffering service if such signaling does not occur when the end of buffer duration is met.

2.1.7.3 Signaling Failure (Buffer Control Protocol Failure)

Signaling failure occurs when a buffer control protocol error occurs. The buffer control protocol (BCP) provides a re-transmission and error handling features that can indicate this event. The BN can act appropriately depending on the severity of the error as discussed in Sec 3.5.

2.1.7.4 System/Host Failure

System failures can include memory depletion, total network connectivity failure, or other faults where the host or system that BN resides enters an unstable and unusable state. Any events or conditions that results in such a state can be considered fatal and render the BN inoperable. The actions taken by the BN upon such events will depends on the severity of the condition and recoverability schemes in place in the system. In such a case, the availability of the BN is determined by its implementation.

2.2 Requirements

There are restrictions that should be imposed to achieve a seamless traffic flow when packets are buffered in transit.

2.2.1 Priority of Buffered Packets

The priority of the buffered packet should be maintained against any newly arrived post-handoff packets in order to avoid out-of-order delivery of packets. Once a positive EOS is met and BN has to forward the buffered packets, it must make certain that the buffered packets be forwarded to MN before any newly arrived packets destined for the MN. This is necessary in order to maintain the sequence of the packets being sent to the MN. Methods to accomplish this are mostly implementation specific and dependent of mechanisms available in the system. Common methods are as follows.

2.2.1.1 Additional Forwarding Queue in the BN

An additional forwarding queue maybe implemented in addition to the BN's main buffer. The forwarding queue maybe used to store newly arrived post-handoff packets destined for the MN while the BN's buffer is being flushed. This has the effect of having two buffers used in sequence. Flushing of the buffers is exclusive with the main buffer having higher priority over the forwarding queue. As an example, systems can take advantage of traffic control queues (i.e. Linux traffic control module) to implement queue priority.

2.2.1.2 System Receiver Queue

Some systems implement an interface receiver queue (network driver rx queue) to buffer incoming packets before being forwarded by the system. The BN can utilize this feature by pre-empting the processing of packets stored in this queue. The BN can pre-empt the system and flush its buffers before the system begins routing packets stored in the receiver queue. One caveat is that the receiver queue holds all incoming packets for that interface. Therefore, pre-empting the processing of the receiver queue would generally delay delivery of all packets and not just packets for the MN.

2.2.2 Flushing and Forwarding Rate on EOS

The flushing and forwarding rate in the BN after a positive EOS should be greater than the receive rate of the newly arrived post-handoff packets. If this is not the case, there is a greater possibility that the queue holding the post-handoff packets (2.2.1.1 and 2.2.1.2) will be filled before the BN's buffer is empty. This will result in over flow of post-handoff queues and eventually packet loss. The flushing and forwarding can be done exclusively by the BN if the BN pre-empts all other actions in the system (i.e. spin-locking). This can guarantee that flushing and forwarding will occur prior to any other forwarding. However, the BN should take great care with this approach since a lengthy pre-emption may have adverse effect on the systems health. In all cases, the solution is implementation specific.

2.2.3 Maximum Buffering Service Duration

Maximum limits to the service duration should be administratively configured in the BN by defining a maximum size of the buffer as well as maximum duration of bp value as described in Sec 2.1.3.1. These limits should consider the local resources available to the BN. The limits should be considered non-negotiable values.

2.2.4. Communication Link to MN

It is assumed that signaling (BCP) between MN and BN exists before and after handoff.

3. Buffering Control Protocol (BCP)

The BCP is a control protocol used by the MN to request buffering services at the BN. It is a simple, reliable messaging system composed of request and answer signal pairs. The BCP may be defined as a new protocol or as extensions to existing protocols such as PANA, SIP, and Mobile IP (v4/v6) or defined as extensions to link layer protocols. In Mobile IPv6 for example, it can be possible to define a new mobility option in Binding Update/Acknowledgement message exchange that carries the BCP in TLV format. In PANA, it is possible to define BCP AVP's that can be appended to the PUR/PUA message exchange. Other methods may be employed as long as the requirements of the BCP signaling can be accommodated. In all cases, delivery and encoding of BCP signals may become specific to each protocol that carries BCP.

3.1 Protocol Signals

As a rule, request signals are sent from the MN to the BN and answer signals are sent by BN to MN in response to a request signal. The BN should never generate a request signal. Request signals carry parameters regarding the request, and the answer signals contain result codes. Reliability is supported by using transmission timeouts, re-transmission, and error handling behavior. The BCP uses the following signal pairs.

3.1.1 BReq[initial] and BAns[initial]

These signals are always the first to be exchanged between MN and BN. It is used to establish the buffering service as described in Sec 3.3.1. These signals have the following format.

BReq[initial]={id,bp,tc,bsz,p} id—MN Id used to uniquely identify the MN to the BN. This can be the source address or mac address of the MN.
bp—Buffering Period
tc—Application specific traffic to be classified and buffered
bsz—Suggested buffer size to be allocated
p—FP for EOS, valid values are drop, forward or drop with signal
flag {m}—Request flags
m—if set bsz is mandatory and cannot be negotiated BAns[initial]={id, bp, bsz, rcode} id—MN Id used to uniquely identify the MN to the BN. This can be the source address or mac address of the MN.
bp—Buffering period for this service
bsz—Buffer size allocated for this service
rcode—Result code provided by BN

3.1.2 BReq[ext] and BAns[ext]

These signals are exchanged after establishing buffering service and before or after the MN's handoff period. They are used to extend the parameters of the buffering service as described in Sec 3.3.2.

BReq[ext]={id,seq,bp,bsz,p,coa} id—MN id sent in the BReq[initial]
seq—Signal sequence number
bp—Additional buffering period, maybe zero (0)
bsz—Additional buffer size, maybe zero (0)
p—new FP for EOS, valid values are drop, forward or drop with signal
coa—current CoA of the MN BAns[ext]={id,seq,bp,bsz,rcode} id—MN id sent in the BReq[initial]
seq—Signal sequence number, must match BReq[ext]
hp—New buffering period for this service
bsz—New buffer size allocated for this service
rcode—Result code provided by BN

3.1.3 BReq[stop] and BAns[stop]

These signals are exchanged to stop the buffering service as described in Sec 3.3.3.

BReq[stop]={id,p,coa} id—MN id sent in the BReq[initial]
p—Termination FP for EOS, valid values are drop, forward or drop with signal
coa—current CoA of the MN BAns[stop]={id,rcode} id—MN id sent in the BReq[initial]
rcode—Result code provided by BN

3.2 Service Attributes

The BCP also creates service attributes (state information) within the BN. These attributes can include the following:
MN Id (id);
Buffering period (bp);
Negotiated buffer size (bsz);
Traffic classification (tc) parameter;
FP, current EOS flushing policy;
Last extension request sequence number;
Current MN CoA;
Previous MN CoA.

The attributes can be allocated during the request phase as described in Sec 3.2.1. The values of the attributes are updated by the BN upon receiving valid request signals or other local events. The attributes lifetime is limited to the duration of the service. If a positive or negative EOS is met, the BN releases the resource occupied by these attributes.

3.3 Service Phases

In general, the BCP can divide the BN service into three phases. A buffering service must complete these phases in sequence.

3.3.1 Service Request Phases

The service request phase is the initial phase used to establish a buffering service for an MN. It spans a single BReq[initial]/BAns[initial] signal exchange between MN and BN to negotiate the buffering requirements and determine if the BN can fulfill those requirements. If the BN is able to accommodate the MN then state information is allocated and the buffering of MN traffic starts immediately. The BN then sends a BAns[initial] to the MN with result code (rcode) indicating success. If the BN has made adjustments to hint values provided by the MN and is able to provide the service, the buffering service is also started with the BAns[initial] including an rcode indicating an error. If the BN is unable to provide service then no state information is allocated and the BN sends a BAns[initial] with the appropriate error code. The MN sends the following parameters in the initial BReq[initial].

3.3.1.1 Buffering Period

Since the MN may have prior knowledge of the length of the buffering period, which may be an estimated value of the handover period, the MN can send this value to the BN. The BN can use this value for bp if it does not exceed a locally configured maximum limit, as described in Sec 2.2.3. If the value is below the maximum limit, the BN should set the rcode to indicate success in the BAns[initial]. If it exceeds the maximum limit, the BN can either deny the buffering request or use the maximum limit as the bp value. In either case, the BN should notify the MN of its decision by setting the rcode to indicate an error in the BAns[initial]. The MN has the option of terminating the service if the BN uses a maximum value that the MN perceives to be unsuitable. In such a case, the MN can proceed immediately to the termination phase as described in Sec 3.3.3.

3.3.1.2 Buffer Size (bsz)

The MN can suggest a bsz to be used by the BN during the service. This is possible since the MN may have prior knowledge of the application being used and consequently the expected traffic rate and channel conditions. In combination with the handoff period, the MN may be able to calculate a reasonable bsz needed to accommodate the classified traffic. However, the bsz provided by the MN is only a hint to the BN. The BN has the final authority on the actual bsz to be used based on locally available resources. If the BN is able to accommodate the bsz hinted by the MN, it may set the rcode indicating success in the BAns[initial]. If the BN is unable to accommodate the hint value, it may use the locally configured maximum limit and notify the MN of its decision by setting the rcode to indicate an error in the BAsn[initial]. The MN has the option of terminating the service if the bsz issued by the BN is unsuitable. In such a case, the MN can proceed immediately to the termination phase as described in Sec 3.3.3.

3.3.1.3 Traffic Classification (tc)

By default, all traffic destined for the MN will be buffered by the BN during the buffering period. However, the MN may provide parameters regarding the type traffic that needs to be buffered. This is in case that the MN is interested in buffering only certain types of traffic (tc). The format of the tc parameter is implementation specific and the MN may be required having prior knowledge of this implementation.

3.3.1.4 Flushing Policy

The FP sent by the MN dictates the policy that the BN should enforce with the buffered packets once EOS is met as described in Sec 2.1.3. Currently supported policy is to forward or drop the packets as described in Sec 2.1.4. A FP value in BReq[initial] specifying that the BN drop the buffered packets on any EOS may seem inappropriate since the service becomes meaningless. However, there can be cases where the MN decides to enforce two (2) different policies depending on the EOS conditions met as described in Sec 2.1.3. As an example, an MN may wish to drop all packets when time-limited buffering EOS is met, and forward all packets when explicit signaling EOS is met. In such a case, the default FP is set to drop all packets, and subsequent BReq[stop] that signals a positive EOS can carry a FP that forward all packets.

The FP supplied in BReq[initial] may also be set to null In such a case, the FP used may be a locally configured value.

3.3.2 Buffering Phase

The buffering phase spans the period when traffic classification and buffering is occurring. This begins immediately after the BN responds with a BAns[initial] in the request phase indicating that buffering service is being provided, and ends when an EOS condition is met. During this phase, the BN and MN can exchange one or more extension request (BReq[ext]/BAns[ext]). Each exchange completes an extension request negotiation. Extension request allows the MN to re-negotiate the attribute values that has been established during the request phase or previous extension request exchanges. It allows the buffering service to be extended. A BReq[stop]/BAns[stop] exchange may also be performed in this period to abort the buffering service. In such a case, the FP supplied with the BReq[stop] may enforce a policy of dropping all buffered packets.

Care should be taken when performing extension request since the signal exchange is done before or after the handoff period. Thus, the MN synchronizes the signal exchange with the handoff period to make sure network connectivity is available during the signal exchange.

In contrast to BReq[initial], the parameters provided by BReq[ext] are to be added to existing attribute values. Except for the FP, the resulting new values can be subject to the same limits and conditions imposed on the initial values in Sec 3.3.1. The MN sends the following parameters in every BReq[ext].

3.3.2.1 Buffering Period

The MN may notify the BN of additional handoff delay in the BReq[ext] signal. The handoff value provided in BReq [ext] is added to the existing handoff attribute value and subjected to the limits and conditions specified in Sec 3.3.1.1. This process is repeated for each new BReq[ext] received by the BN. In the case that the MN is not interested in adjusting this specific value, it may set this parameter to zero (0).

3.3.2.2 Buffer Size (bsz)

The MN may provide a hint to the BN of how much more bsz is required for the extension request. The bsz value provided in BReq[ext] is added to the existing bsz attribute value and subjected to the limits and conditions specified in Sec 3.3.1.1. This process is repeated for each new BReq[ext] received by the BN. In the case that the MN is not interested in adjusting this specific value, it may set this parameter to zero (0).

3.3.2.3 Flushing Policy

The MN may use BReq[ext] to establish a new default FP for the current buffering service. The BN enforces the new FP when an EOS is met. If the FP supplied in BReq[ext] is null, then it is an indication to the BN to maintain the existing FP attribute value. If the existing attribute value is null, then the BN should set the FP attribute value to a locally configure value.

3.3.2.4 CoA Information

The BReq[ext] can also be used to update the CoA of the MN to facilitate forwarding as described in Sec 2.1.5. Carrying the CoA on BReq[ext] is necessary in the case that the time-limited timeout pre-empts explicit signaling to meet a positive EOS. Having a CoA parameter in BReq[ext] also makes the BCP and BN architecturally independent of the circumstances in which it is being used. As an example, a BN residing on a MN, as shown in FIG. 3 can notify the BN of its previous CoA in case of ping-pong effects as discussed in Sec 2.1.6.

3.3.3 Termination Phase

Termination phase begins when an EOS is met, as described in Sec 2.1.3 and ends when all resource allocated for the buffering service is released to the system. When a positive EOS is met and forwarding policy is enforced, the BN should follow the forwarding requirements described in Sec 2.1.5 and Sec 2.2. In case of explicit signaling, a BReq [stop]/BAns[stop] is exchanged between MN and BN to terminate a buffering service. The MN should synchronize with the handoff period to make sure that there is network connectivity during the signal exchange. An explicit BReq[stop] can also be used by the MN to abort the buffering service. The service is aborted when the MN signals a BReq[stop] with a FP that enforces the packets to be dropped. BReq[stop] has the following parameters. In addition, if the BN has determined to perform forwarding of the buffered packets to the MN, the MN and BN are on different IP links, and there is no tunnel between the BN and MN, then the BN also creates a new tunnel to the MN.

3.3.3.1 Flushing Policy

During the termination phase, the BN should enforce the FP supplied in BReq[stop]. If the FP supplied in BReq[stop] is null then the BN should enforce the existing FP attribute value. A FP, which specifies forwarding, should follow the forwarding requirements in Sec 2.2.

3.3.3.2 CoA Information

If BReq[stop] signal carries a CoA information, it should take override previous CoA information carried in BReq[ext] and should be used when forwarding the buffered packets. The BReq[stop] can also be used as a signal to establish an IP-IP tunnel in case the new CoA resides in the IP network different from it's home. Details are provided in Sec 2.1.5.

3.4 Protocol Signal Flow

Figure 4:
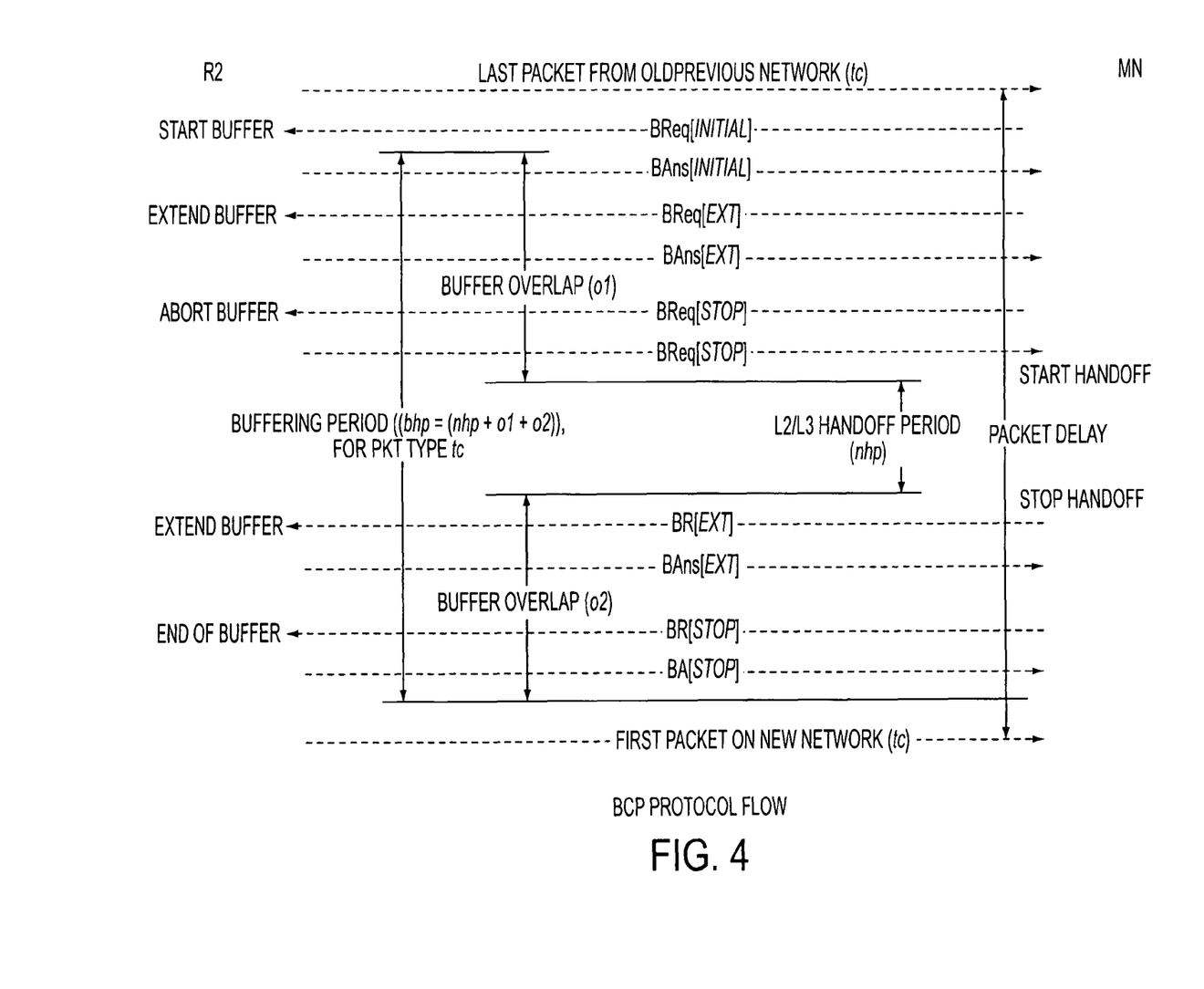
FIG. 4 is an illustration of the BCP protocol flow.

The protocol flow shown in FIG. 4 provides a general sequence of the signal exchanges as it relates to the MN handoff, traffic classification and buffering. The variables o1 and o2 define the period where valid MN and BN can occur when network connectivity maybe present during the buffering phase.

3.5 Protocol Reliability

The BCP is a lock-step protocol that requires completion of an existing signal exchange before another signal exchange can be initiated. This simplifies the state transition in the BN and rigidity in re-transmission.

BCP uses transmission timeouts and re-transmission to detect failure in signaling. Only request signals are re-transmitted. If an MN sends a request and does not receive an answer within a specified timeout period, it should re-transmit the request. An error condition occurs in the MN if no answer is received after a maximum number of re-transmission has occurred. Both the transmission timeout and maximum number of re-transmission should be a reasonable value to minimize overall delay. Answer signals sent by the BN should not be re-transmitted. The BN should respond with the same answer signal to any re-transmitted request. If connectivity with the MN is lost completely, the BN can rely on the hp value to terminate the buffering service.

For BReq[ext], the BN should also rely on the sequence number associated with this signal to determine if the BReq [ext] it receives is a re-transmission. BAns[ext] signals sent by the BN must supply a matching sequence number equal to the sequence number in BReq[ext] associated with the answer. This is required since multiple BReq[ext]/BAns[ext] exchanges may occur. BReq[initial]/BAns[initial] and BReq [stop]/BAns[stop] signals does not require sequence number checks since these exchanges should only occur once during the beginning and end of the buffering service respectively. Signal validity can also be supplemented by checking the values of the sequence number.

3.6 Discovering BN Availability in a Network

An MN may attempt to send a BReq[initial] to a network entity in both the existing network and the new network it is moving towards to discover the availability of buffering service. The MN can use the lack of response from the network entity to indicate which network does not provide buffering service. The lack of response should be defined as the time when the MN reaches the maximum number of re-transmission attempts without receiving an answer. If an MN receives no response from both networks then the service is not present. If the MN receives response from both networks then the MN should choose which network will provide the service and abort the request in the network it did not choose. Alternatively, the availability of the buffering service can be provided by existing mechanisms such as DNS or DHCP.

3.7 Security Considerations

The BCP does not provide inherent security. It relies on security provided by lower layer, IP layer (i.e., IPsec) or parent protocol that carries it, as described in Sec 3.8.

3.8 Implementation Considerations

BN implementations may use of methods and facilities existing on a system. As an example, in Linux systems, traffic classification can be done by using netfilter (iptables) or traffic control modules. Complex classification rules can be installed on a per flow basis using these tools. In addition, buffering can also be implemented using traffic control modules along with BN specific controls.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to."

In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method of handing off without packet loss, a mobile device traveling along a series of neighboring networks, comprising:
   providing a per-mobile packet buffer at, at least one of an access router, a network node near the edge of the network from which the mobile device is moving away, a network node near the edge of the network that the mobile device is moving towards, a mobile node and a correspondent node,
   said mobile device encountering a period during which there is no network connectivity when moving from one network to another, and
   said per-mobile packet buffer forwarding buffered packets to and/or from said mobile device when the handoff process is completed, wherein a protocol used for buffering control of the buffered packets is defined as a separate buffering protocol independent from and not tied to employed mobility management protocol to limit the buffered packets at the per-mobile packet buffer, said buffering protocol being configured to define buffering sessions with mobile node identification of buffering period and buffering data,
   said buffering protocol employing communications between the mobile device and the per-mobile packet buffer and not employing communications between an access router of the network the mobile device is moving away from and an access router of the network the mobile device is moving towards, and
   said buffer control protocol working along with any employed mobility management protocol by the buffer control protocol including a mechanism for the mobile device to include its current care of address (CoA) in a buffer protocol message to the per-mobile packet buffer.

2. The method of claim 1, wherein buffering is used in conjunction with existing mobility protocols, access protocols, or as an independent network or link layer mechanism.

3. The method of claim 2, whereby the buffering system is compatible with at least one mobility management protocol.

4. The method of claim 3, comprising defining the tunnel establishment mechanism used for forwarding buffered packets to the mobile device to provide independency of mobility management protocols.

5. The method of claim 3, comprising modifying the destination IP address of said buffered packets to nCoA, as part of said forwarding, as a mechanism for lessening the complexity of tunnel management.

6. The method of claim 3, comprising modifying to nCoA, the destination IP address of said buffered packets.

7. The method of claim 2, wherein said buffering control protocol is used by said mobile device to request buffering services at the buffering node, said buffering control protocol being a new protocol, an extension to existing protocols, or extensions to link layer protocols.

8. The method of claim 1, further comprising controlling packet buffering at an access point during a handover by providing a defined protocol at link layer.

9. The method of claim 8, wherein an existing flushing protocol forwards buffered packets after a positive end of service, said buffer node having been provided with the current care-of-address of the mobile device when it starts flushing the buffered packets, and said buffering control protocol indicating to said buffer node current care-of-address of the mobile node.

10. The method of claim 9, wherein when said mobile device and said buffer node are on the same IP subnet, sending locally to said mobile device by using an address resolution protocol said buffered packets, and when the mobile device and said buffer node are on different IP links, sending buffered packets to its next hop router towards the mobile device and are routed to the mobile device using IP routing.

11. The method of claim 1, further comprising buffering said buffering node packets that are in transit during the handoff period, and upon completion of handoff, flushing buffered packets and forwarding flushed buffered packets to said mobile device in its new location.

12. The method of claim 1, further comprising buffering egress packets from said mobile device during the handoff period and buffering packets in a buffer node at the network edge, thereby providing bi-directional buffering during handoff and compensating for packet loss in both directions.

13. The method of claim 1 further comprising buffering packets in a buffer node located within the access router when said mobile device performs active scanning.

14. The method of claim 1 wherein prior to handoff, pre-handoff traffic reaches the mobile device via the previous network, when said mobile device is ready to move to a new network, said mobile device signals said buffer node its intent and the buffer node begins to buffer traffic that is still being forwarded through the previous network and is destined for the mobile device, upon completion of handoff said mobile device signals said buffer node to flush buffered packets, and forwarding said buffered packets to said mobile device in its new network, said buffered node residing on a previous access router, a next access router and/or said mobile device.

15. The method of claim 1, further comprising buffering packets in a node that is a network entity that intercepts packets destined for one or more mobile devices, and temporally buffers said packets to avoid packet loss while said each mobile device is in the handoff process, classifying packets for each mobile node in said network entity buffer node, forwarding buffered packets appropriately after handoff is completed, and wherein each of these steps is signaled by a mobile device that requests buffering service.

16. The method of claim 15, further comprising classification of packets to be buffered being dictated by said mobile device using BReq[initial] to signal the buffering node to only buffer packets of interest to the mobile device.

17. The method of claim 1, wherein said mobile device requesting buffering service from said buffer node using a buffering control protocol, said protocol communicating buffering request result and error conditions, said buffer node responding to requests but does not generate requests, said buffering service being a transient service, and beginning buffering when a buffering node receives a BReq[initial] from a mobile device and negotiated value have been established.

18. The method of claim 1, wherein a BReq[initial] and a subsequent BReq sent by mobile devices dictates the policy that the buffer node enforces against any buffered packet, a flushing policy is enforced by the buffer node that is either forwarding or dropping the buffered packets, and sending explicit error notification to said mobile device using the buffering control protocol or an out-band mechanism.

19. The method of claim 1, wherein a buffering phase spans the period during which traffic classification and buffering is occurring, beginning immediately after the buffer node responds with a Bans[initial] during a request phase indicating that buffering service is being provided and ends when an end of service condition is met, during said buffering phase, said buffer node and said mobile device can exchange one or more extension requests, and wherein each exchange completes an extension request negotiation.

20. The method of claim 19, wherein in a case where said buffer node and said mobile device are co-located, the extension request negotiation is done locally within the mobile device.

21. The method of claim 1, further including employing an independent tunnel establishment mechanism for forwarding buffered packets to the mobile node independent of any employed mobility management protocol.

22. The method of claim 1, wherein said buffering management protocol is configured to signal events and parameters between a mobile node and a buffering node, and includes buffering requests configured to be transmitted by a mobile node and buffering answers configured to be transmitted by the buffering node as request and answer pairs with re-transmission capabilities.

23. The method of claim 22, wherein said buffering management protocol is configured to enable a mobile node discover the availability of buffering service by sending buffering request signals to discover the availability of buffering service.

24. The method of claim 1, wherein said buffering management protocol is configured to include a parameter within a buffering request containing traffic classification information whereby the mobile node identifies for the buffering node certain types of traffic to be buffered and including a parameter within a buffering request containing a buffering period.

25. The method of claim 24, wherein said buffering management protocol is configured to include a parameter within a buffering request containing size of buffer allocation information whereby the mobile node identifies for the buffering node size requirements and includes a parameter within a buffering request containing an identification of the mobile node.

26. The method of claim 1, further including enabling the buffer control protocol to work along with any employed mobility management protocol by having the buffer control protocol include a mechanism to indicate to a buffer node the current care of address (CoA) of the mobile device which includes by the mobile device providing its current CoA in a BReq (stop) message to the buffer node.

27. The method of claim 1, further including having the mobile device and the buffer negotiate a time-limited timeout value to determine end of service (EOS), and wherein expiration of the timeout period prior to an explicit receipt of a BReq [stop] signal constitutes a positive EOS and enforcement of existing flushing policy.

28. The method of claim 1, further including having the mobile device transmit a message to network entities in both the current network and the new network to which it is moving to discover the availability of buffering service, and wherein if the mobile device receives responses from both networks indicating availability of buffering services, the mobile device chooses which network will provide buffering services.

29. The method of claim 1, further including the mobile device calculating a suggested buffer size based on handoff period and communicating the suggested buffer size to the buffer in a BReq message, wherein the buffer can accept the suggested buffer size or issue another buffer size.

30. The method of claim 1, further including after establishing buffering services, extending the parameters of the buffering service using a BReq [ext] signal from the mobile device to the buffer having a parameter designated to extend buffer size or buffer period.

31. The method of claim 1, further including said buffering protocol being a lock-step protocol that requires completion of an existing signal exchange before another signal exchange is initiated, and employing transmission time outs and re-transmission to detect failure in signaling.

32. The method of claim 1, further including said buffering protocol involving a BReq [initial] transmission sent from the mobile device to the buffer which includes parameters for:
 (id) uniquely identifying the mobile device;
 (bp) identifying a suggested buffer period;
 (tc) identifying certain application specific traffic to be classified and buffered;
 (bsz) identifying a suggested buffer size; and
 (EOS) identifying a flushing protocol for end of service (EOS).

33. The method of claim 1, further including said buffering protocol involving a transmission sent from the mobile device to the buffer which includes an identification of certain application specific traffic to be classified and buffered and based thereon said buffer only buffers a portion of all types of traffic destined for the mobile device based on said identification of certain application specific traffic to be classified and buffered.

34. A system for handing off without packet loss, a mobile device traveling along a series of neighboring networks mobile node, and encountering a period during which there is no network connectivity, comprising:

a per-mobile packet buffer at an access router, a network node near the edge of the network that the mobile device is moving away, a network near the edge of the network that mobile device is moving towards, a mobile node, and/or a correspondent node, said buffer node forwarding buffered packets to and/or from said mobile device when the handoff process is completed, wherein a protocol used for buffering control of the buffered packets is defined as a separate buffering protocol independent from and not tied to employed mobility management protocol to limit the buffered packets at the per-mobile packet buffer, said buffering protocol being configured to define buffering sessions with mobile node identification of buffering period and buffering data, said buffering protocol being employed in communications between the mobile device and the per-mobile packet buffer and not being employed in communications between an access router of the network the mobile device is moving away from and an access router of the network the mobile device is moving towards, and said buffer control protocol working along with any employed mobility management protocol by the buffer control protocol including a mechanism for the mobile device to include its current care of address (CoA) in a buffer protocol message to the per-mobile packet buffer.

35. The system of claim 34, said system further comprising:

a per-mobile packet buffer at an access router, a network node near the edge of the network from which the mobile device is moving away, and/or a network node near the edge of the network from which the mobile device is moving towards, a mobile node, a correspondent node, said buffering control protocol signaling events and parameters between the mobile device and the mobile node, queuing and forwarding mechanisms for buffering packets, a buffer node in said mobile device for buffering egress packets during the handoff period in said mobile device buffer node, buffer packets in a buffer node at the network edge, said buffer node providing bi-directional buffering during handoff and compensating for packet loss in both directions, said buffer node being a network entity that intercepts packets destined for one or more mobile device and temporally buffers said packets to avoid packet loss while said mobile devices is in the handoff process, said buffer node classifying packets for each mobile node, buffering classified packets, and forwarding buffered packets appropriately after handoff is completed, and an address resolution protocol that sends said buffered packets locally to said mobile device when said mobile device and said buffer node are on the same IP subnet, and sends buffered packet to a next hop router towards the mobile device and routing buffered packet to said mobile device using IP routing when said mobile device and said buffer node are on different IP links.

36. The system of claim 34, wherein said buffering management protocol is configured such that said buffering node receives a buffering request message from a mobile node including parameters for identifying buffering period, application specific traffic to be classified and buffered, buffer size to be allocated, and including a buffering request flag.

* * * * *

UNITED STATES PATENT AND TRADEMARK OFFICE
CERTIFICATE OF CORRECTION

PATENT NO.       : 8,068,460 B2                                         Page 1 of 1
APPLICATION NO.  : 11/162199
DATED            : November 29, 2011
INVENTOR(S)      : Fajardo et al.

It is certified that error appears in the above-identified patent and that said Letters Patent is hereby corrected as shown below:

On the Title Page, in Item (73), under "Assignee", in Column 1, Line 2, delete "(US)" and insert
-- (US); Telcordia Technologies, Inc., Piscataway, NJ (US) --, therefor.

In The Specification

In Column 8, Line 36, delete "[3]" and insert -- [2] --, therefor.

In The Claims

In Column 23, Line 29, in Claim 18, delete "by" and insert -- by said --, therefor.

In Column 25, Lines 20-21, in Claim 34, delete "mobile device is....., and" and insert the same at Line 19, after "the", as a continuation sub-point.

Signed and Sealed this
Twenty-seventh Day of January, 2015

Michelle K. Lee
*Deputy Director of the United States Patent and Trademark Office*